United States Patent [19]

Ehrlich

[11] 4,169,459
[45] Oct. 2, 1979

[54] SOLAR CONVERTER

[76] Inventor: Brent H. Ehrlich, R.R. 1, Box 269, Murphysboro, Ill. 62966

[21] Appl. No.: 807,539

[22] Filed: Jun. 17, 1977

[51] Int. Cl.$^2$ ................................................ F24J 3/02
[52] U.S. Cl. ...................................... 126/432; 34/93; 126/450
[58] Field of Search .................... 126/271, 270; 34/93; 237/1 A

[56] References Cited

U.S. PATENT DOCUMENTS

| | | | |
|---|---|---|---|
| 3,412,728 | 11/1968 | Thomason | 126/270 |
| 3,902,474 | 9/1975 | Pyle | 126/271 |
| 4,016,860 | 4/1977 | Moon | 126/271 |
| 4,048,983 | 9/1977 | Pei | 126/271 |
| 4,069,809 | 1/1978 | Strand | 237/1 A |
| 4,086,908 | 5/1978 | Werner | 126/270 |
| 4,086,909 | 5/1978 | Lyon | 126/270 |

FOREIGN PATENT DOCUMENTS

23624 of 1911 United Kingdom ..................... 126/271

*Primary Examiner*—Paul E. Maslousky
*Attorney, Agent, or Firm*—Keil & Witherspoon

[57] ABSTRACT

A solar heating unit which is covered at the top by a glass plate and at the bottom by an insulating layer, and at a height therebetween by an absorber plate which divides the unit into an upper and lower chamber through which forced air is guided to flow in opposite directions in contact first with the top and then the bottom surface of the absorber plate. The absorber plate has a smaller spacing from the glass cover than from the bottom insulating layer so that the air flows through the upper chamber at a faster rate than through the lower chamber. Due to this design the temperature gradient of the air on the two sides of the cover plate is held relatively low and heat losses through this cover are reduced at a minimum of expense. Several portable heating units of this design may be serially connected to form a free-standing solar heating assembly, for example, for supplying drying air to a grain bin.

10 Claims, 3 Drawing Figures

SOLAR CONVERTER

BACKGROUND OF THE INVENTION

The invention relates to solar converters and in particular to solar heating units for use in crop-drying systems. It should be noted, however, that the invention has also broader applications, for example in connection with the space heating of houses.

It is known to dry crops, such as harvested grain, in a variety of ways. The most common for small farms is to place the grain in a grain bin and to blow air into a duct located at the lower portion or false bottom of the bin. The passage of air through the bin tends to remove the moisture from the grain. This technique of drying grain is generally adequate without use of additional heat sources when the relative humidity is low. That is, at low humidity the ambient temperature is sufficient to perform the drying function. When the humidity is high, supplemental heat is added to the air flow in order to facilitate removal of moisture. Conventionally this addition of heat is carried out by fuel-burning heaters; however, it has also been proposed to use for this purpose, alternatively or additionally, solar heating units. These units may be housed in the bin or other structure itself, for example in the roof thereof, or they may be designed as free-standing units which are connected to the bin or the like by means of ducts.

Typically such solar heating units consist of an enclosure through which drying air is forced. Mounted in the enclosure is an absorber plate and the enclosure is covered by a transparent cover through which solar radiation is transmitted to the inside of the unit where it is absorbed, and converted into heat, by the absorber plate.

OBJECTS AND SUMMARY OF THE INVENTION

It is an object of the invention to provide a solar converter of this general kind which provides for efficient energy conversion and which particularly minimizes the losses of energy through the transparent cover of the unit.

It is another object of the invention to provide a design for such a converter by which these results can be achieved in a simple way and at low cost.

It is yet another object of the invention to provide a free-standing multi-modular solar heating assembly which meets the foregoing objectives.

It is a further object of the invention to provide a solar heating system for supplying drying air to a crop-drying bin which makes use of such a solar heating assembly.

Briefly the solar converter described herein has an enclosure with an upper cover of material transparent to solar radiation, a lower cover which may be in part of heat insulating material, and a sheet of solar energy absorbing material, such as a metal plate, which extends longitudinally to the enclosure between the upper and lower cover so as to define an upper chamber and a lower chamber, respectively; the upper chamber has at one end an inlet for receiving impelled fluid such as air to be heated, the lower chamber has at this end an outlet for letting off the heated fluid, and the two chambers are interconnected at the other end so that the fluid flows in contact with the upper surface of the sheet of absorbing material in one direction and then in contact with the lower surface of the sheet in the opposite direction.

The resulting counter-directional flow of forced air past the two opposite surfaces of the absorber plate makes for efficient transfer of heat to the air; on the other hand, since the air in the upper chamber to which the air is introduced, is at a relatively low temperature the heat losses from this upper chamber to the outside through the transparent top plate are comparatively low. According to a preferred feature of the invention, the sheet of absorbing material is more closely spaced from the upper cover than from the lower cover of the converter so that the flow of forced fluid longitudinally of the upper chamber is at a faster rate than longitudinally of the lower chamber. As a result, the rise of air temperature as the air travels lengthwise of the upper chamber is low compared to the rise of air temperature as it travels lengthwise of the lower chamber and this circumstance further contributes to the reduction of heat losses through the upper cover of transparent material.

According to a further feature of the invention a plurality of portable solar heating units having the two-chamber structure just described are arranged in series relationship to each other to form a free-standing solar heating assembly and this assembly, in conjunction with an air impeller, may be used for supplying drying air to a grain bin for example.

A free-standing modular solar heating assembly for use in connection with grain dryers is known per se through U.S. Pat. No. 3,919,784. However, in this known design the absorbing sheet which in this case is in the form of an opaque black polyethylene film, is placed at the bottom of each solar heating module so that this known module has only a single air chamber—rather than, as in the case of the invention, two superimposed chambers which are formed by an intermediately located absorber plate and through which the air streams in opposite directions. Since in the known design only one side of the absorber sheet is in contact with the air, only one half the radiating or, more generally, heat transfer surface is available in that design to warm the air passing through the module.

In U.S. Pat. No. 2,680,437 a solar collector has been disclosed which uses a plurality of glass plates which are disposed in mutually spaced relation, one on top of the other and between which forced air flows from one end of an upper chamber to the other end of a lower chamber. The lowermost of these glass plates is covered with aluminum foil cemented to the glass with a jet black adhesive. Consequently, sunlight falling on the device passes through the cover glass and all the aforementioned glass plates until it strikes the aluminum foil where it is absorbed and changed to heat. From the foregoing it will be seen that in this known solar collector the air contacts the absorber sheet only on one side thereof and moreover, the air flows on the bottom side of the glass plate carrying the absorber sheet, in the same direction as it does on the top side of this plate. Furthermore, since in this known solar collector the absorber sheet is separated from the glass cover of the unit by the array of intervening glass plates the spacing of this sheet from the glass cover of the unit is much larger than from its bottom cover. While the heat trapping effect of this array of glass plates tends to keep the temperature on the underside of the glass cover, and hence the temperature gradient through this cover to the outside, relatively low this is accomplished at the expense of a considerable energy loss due to multiple surface reflection of sunlight from the intermediate glass plates and the cover glass. Also, the design of this known unit is complex and its manufacturing costs are high.

DETAILED DESCRIPTION OF THE DRAWING

An embodiment of the invention will now be described with reference to the accompanying drawing in which.

DESCRIPTION OF THE PREFERRED EMBODIMENT

Figure 1:
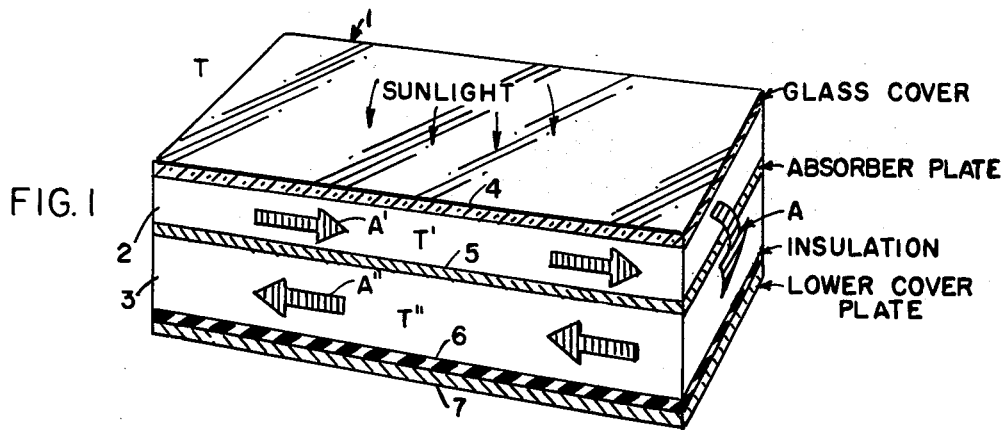
FIG. 1 is a perspective and partially schematic view of a solar heating unit according to the invention.

Referring to FIG. 1 there is perspectively shown a solar heating unit which comprises a rectangular box 1 with the following principal components: two rectangular hollow metal frames, 2 and 3, placed on top of each other with an absorber plate 5 therebetween; a transparent cover 4, preferably of glass; and a lower cover plate 7 on top of which an insulating plate of a suitable insulating material is placed. While the precise dimensions of this unit are not critical to the operation of the invention, the rectangular dimensions of the box may be typically 4'×12' and the box may be approximately 12 inches high.

Sunlight passes through the transparent top cover 4 on the energy absorbing plate or sheet 5 which is of relatively thin sheet metal, such as aluminum or copper, or of other conductive material, and which is painted jet black on both surfaces. The lower cover, plate 7, is preferably constructed of aluminum or any other inexpensive material. A foamed urethane or fiberglass or any other form of insulation sheet 6 may be placed as insulation on top of the lower cover to counteract heat losses out of the lower chamber where this is required.

In the embodiment shown herein, the distance between absorber plate 5 and the insulated lower cover assembly 6,7 is approximately twice as large as the distance between the absorber plate and the upper glass cover 4. For example, the first-mentioned spacing may be 8 inches and the second-mentioned spacing 4 inches, that is in the example illustrated the second spacing is twice as large as the first spacing. In a manner not particularly shown in FIG. 1 air is forced through the left end of the upper chamber, then through the longitudinal extent of this chamber, as indicated by arrows A', and a connection at the right end, indicated in FIG. 1 merely by an arrow A, into the lower chamber where it flows in the direction of arrows A" to an air exit, not particularly shown in the left end of this lower chamber. Because of the relative chamber dimensions, air moving in the upper chamber and in contact with the top surface of absorber plate 5, travels at a relatively higher velocity than that traveling through the lower chamber and in contact with the lower surface of absorber plate 5. As will be noted, the air flows through the two chambers in opposite directions.

One of the problems with solar heaters of the general type forming the starting point of the present invention, is the heat loss occurring outwardly through the transparent cover at the top which is typically of glass, fiberglass or the like. In the past attempts have been made to reduce the heat loss through the glass cover by employing as a cover a plurality of spaced sheets of glass, thereby to provide thermal insulation. However, apart from the added cost, the use of such plural sheets has the disadvantage that they also tend to block the solar energy coming in from the outside. According to a feature of the present invention the aforementioned heat loss is minimized even though plural glass covers are not employed: Since, in the embodiment shown in FIG. 1, the air is moving at a relatively high rate in the upper chamber, it picks up only a comparatively small amount of heat in this upper chamber. Thus the air temperature in this chamber is only slightly raised, viz. from the ambient temperature T of the air entering the upper chamber from the left to temperature T', and because of the resulting relatively low temperature gradient between the two sides of glass cover 4, the heat losses through this glass cover are considerably reduced. Yet, because of the use of only a single cover plate in the embodiment shown, the loss in solar energy entering the heating unit from above is minimized. In the conventional solar heating units the use of one extra cover plate in order to reduce the heat losses out of the upper chamber, results in a 14 percent loss of efficiency since only much less solar energy is permitted to enter the collector. When, as shown by arrow A, the air passes down to the lower chamber, the air velocity decreases due to the larger cross section of this chamber and thus a greater amount of heat is picked up from the lower surface of the absorber plate, raising the air temperature in the lower chamber to T". The black lower side of absorber sheet 5 improves the heat transfer capability of this sheet and efficiently warms the air passing at low velocity through the lower chamber. Since, in the case of the invention, both surfaces of the absorber plate are used to warm the air passing through the collector the heat transfer surface is doubled as compared with the prior art solar heating units in which only one surface of the absorber plate is in contact with the air. The insulated lower cover plate substantially prevents the escape of heat from the bottom of the lower chamber.

Figure 2:
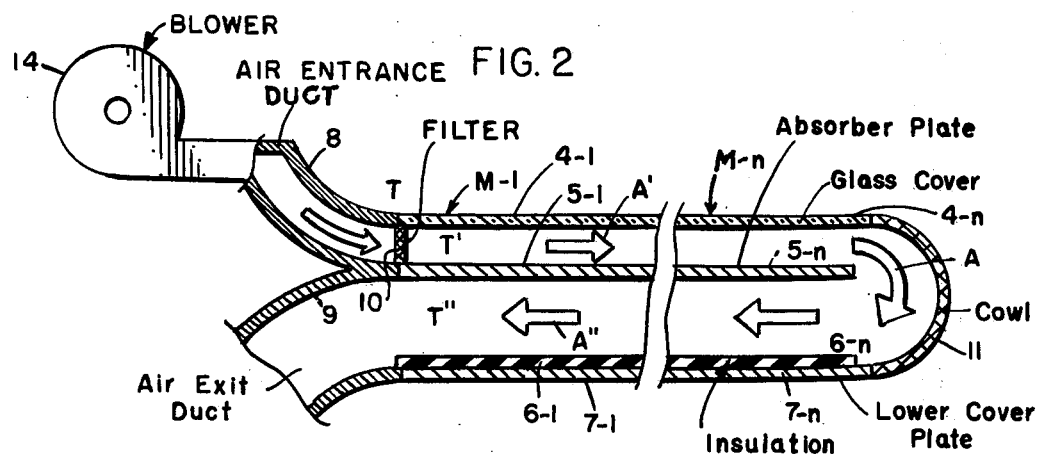
FIG. 2 is a front view, partially in cross section and shown in more detail, of a solar heating assembly according to the invention, which comprises a plurality of solar heating modules in series.

In FIG. 2 there is shown a series or tandem array of solar heating units of the general design shown in FIG. 1. In FIG. 2 generally the same reference numerals have been used as in FIG. 1 except that in FIG. 2 the various components belonging to the first module M-1 of the array have been designated by the addition of the numeral 1—such as 4-1 for the top cover plate—whereas the reference numerals of the last module M-n of the array have the numeral n added thereto. FIG. 2 also shows the air entrance duct 8 which is connected to the left end, as viewed in FIG. 2, of the upper chamber of the first module; and also the air exit duct 9 which is connected to the left end of the lower chamber of this first module. A filter 10 is placed in this intake duct from the assembly in order to filter out dust and other particles. This reduces wear to the absorber plate coating due to the abrasive action of dust. The upper chamber and the lower chamber of the last module M-n are shown connected by means of a cowl 11. By thus connecting the modules end to end the capacity of the overall assembly is correspondingly increased. The individual modules are portable, as the individual unit shown in FIG. 1, and they may be connected with each other by means of tangs and mating recesses in their end faces. The butts between the modules may be sealed with ducting tape to prevent the escape of air. The cowl 11 and the ducts 8,9 are preferably also connected to the modules in the same way. With elements 8,9 and 11 thus designed as detachable units, it will be appreciated that in this fashion the number of modules in the array can be readily expanded when required.

The solar heating modules may be placed into a simple framework placed on the ground so that the entire assembly becomes a free-standing device.

As shown in FIG. 2, the air entrance duct 8 leading to the first module M-1 has a blower or impeller 14 connected thereto so that the air impelled by blower 14 enters duct 8 by way of filter 10, passes through the upper chamber of all the modules in series, then is guided by cowl 11 into the lower chamber of the last module M-n and thence passes in opposite directions through the lower chamber of all the modules in series until it exits through duct 9.

Figure 3:
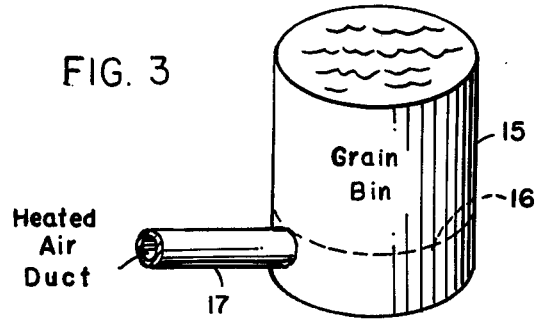
FIG. 3 is a schematic representation, drawn to a smaller scale, of a grain bin with which the solar heating assembly of FIG. 2 may be used.

In the present instance it has been assumed that the solar heating assembly shown in FIG. 2 is used to dry the air in grain bin 15 shown in FIG. 3 and hence air exit duct 9 of FIG. 2 is connected in a manner not particularly shown to heated air duct 17 of the grain bin. As indicated in FIG. 3 the other end of this duct 17 terminates in the false bottom of the grain bin created by perforated floor 16 thereof. Thus the air heated by the solar heating assembly, FIG. 2, acts to dry the grain in bin 15, leaving this bin at the top end thereof. While in FIG. 2 the impeller has been shown connected to the entrance air duct of the heating assembly, it may be connected, alternatively, to the exit duct of this assembly and thus impel the air by suction. In fact, if desired, the impeller in this case may be provided as part of the grain bin itself. By way of example, with eight 4'×12' modules connected in series, a collector array has 384 square feet of collection area and it provides about 100,000 to 150,000 btu's per hour and has an air flow of about 10,000 cubic feet per minute. 3 to 5 cubic feet per minute per bushel of grain is needed to properly dry grain.

Although in the embodiment above described the individual solar heating modules are aligned in a series or tandem array, it is also possible to combine them, additionally or alternatively in parallel relationship to each other. For example, the parallel connected modules may be disposed at a slant, that is at an angle one above the other so as to form a corresponding number of tiers of modules. Tha angle of the whole assembly could be chosen e.g. at 45° to 55° to the horizontal, so as to maximize the impingement of solar energy during the day. One possible arrangement, for example, would be to connect four modules in series and two tiers of such series arrays in parallel, with each of the modules presenting a 4'×12' rectangular surface.

It should also be mentioned that the solar heating units or arrays according to the invention may also be used for purposes other than the drying of crops, for example for the space heating of homes or other structures. In this application the solar converter may be mounted in the roof of the house, for example. While in the case of grain drying, it is desirable to provide for a large air flow through the solar converter with a small temperature differential, preferably about 20°, between ambient air and the solar collector output, in applying the solar converter of the invention to the space heating of homes it is desirable to have a higher temperature differential of, say 160° to 170°, with a relatively low air flow. Because of the resulting higher temperature gradient between the upper chamber and the outside air it may be desirable in applications of this sort to provide for one or more additional glass covers, acting in this way in the manner of thermal panes. However, even in these applications, the number of glass covers required is kept at a minimum if the solar converter is designed according to the principles of the present invention.

Regardless of the application, back-up systems using fuel generated heat may be used to supplement the solar heater according to the invention, for example during the night or at other times when sunlight is not available, or not sufficient, to provide the necessary heating.

Finally, although the invention has been described herein in connection with forced air other fluids may also be used, for example other gases may be heated for industrial purposes according to the principles of the invention.

Thus, while one particular embodiment of the invention has been described herein this should not be interpreted in a limiting sense.

I claim:

1. A solar converter comprising an enclosure having:
an impervious substantially rectangular absorber sheet of solar-energy absorbing material,
an upper, substantially rectangular flat cover extending parallel to said sheet,
upper spacer means for spacing edge portions of said upper cover from corresponding edge portions of said absorber sheet,
a lower substantially rectangular flat cover extending parallel to said sheet,
lower spacer means for spacing edge portions of said lower cover from corresponding edge portions of said absorber sheet,
said absorber sheet being thin compared with the spacing of said covers from said sheet, and said sheet and said upper and lower covers, together with said upper and lower spacer means, defining therebetween an upper chamber and a lower chamber, respectively, said chambers extending lengthwise of said enclosure,
said upper cover being transparent to solar radiation all the way from the outside of said cover to said upper chamber,
said upper chamber having at one end an inlet for receiving impelled fluid to be heated,
said lower chamber having at said one end an outlet for letting off the heated fluid, and
there being provided means for interconnecting said chambers at the other end so that said fluid flows in contact with the upper surface of said absorber sheet in one direction and then in contact with the lower surface of said sheet in the opposite direction.

2. A solar heating unit comprising:
an impervious substantially rectangular absorber sheet of solar-energy absorbing material,
an upper, substantially rectangular flat cover extending parallel to said sheet,
upper spacer means for spacing edge portions of said upper cover from corresponding edge portions of said absorber sheet,
a lower substantially rectangular flat cover extending parallel to said sheet,
lower spacer means for spacing edge portions of said lower cover from corresponding edge portions of said absorber sheet, said absorber sheet being thin compared with the spacing of said covers from said sheet, and said sheet and said upper and lower covers, together with said upper and lower spacer means, defining therebetween an upper chamber and a lower chamber, respectively, said chambers extending lengthwise of said unit, said upper cover being transparent to solar radiation all the way from the outside of said cover to said upper chamber, said upper chamber having at said one end an inlet for receiving impelled fluid to be heated, said lower chamber having at said one end an outlet for letting off the heated fluid, and there being provided means for interconnecting said chambers at the other end so that said fluid flows in contact with the upper surface of said sheet of absorbing material in one direction and then in contact with the lower surface of said sheet in the opposite direction, and said sheet of absorbing material being more closely spaced to said upper cover than to said lower cover so that the fluid flow lengthwise of said upper chamber is at a rate faster then lengthwise of said lower chamber.

3. A solar heating unit as claimed in claim 2, wherein the spacing of said sheet from said upper cover is substantially half of the spacing of said sheet from said lower cover.

4. A solar heating unit as claimed in claim 2, wherein said upper cover includes at least one glass plate.

5. A solar heating unit as claimed in claim 2, wherein said interconnecting means include a cowl attached to said other end of said unit.

6. A solar heating unit as claimed in claim 2, wherein said lower cover is at least in part of heat insulating material.

7. A solar heating assembly comprising:
a plurality of serially aligned, solar heating modules each having
an impervious substantially rectangular absorber sheet of solar-energy absorbing material,
an upper, substantially rectangular flat cover extending parallel to said sheet,
upper spacer means for spacing edge portions of said upper cover from corresponding edge portions of said absorber sheet,
a lower substantially rectangular flat cover extending parallel to said sheet,
lower spacer means for spacing edge portions of said lower cover from corresponding edge portions of said absorber sheet,
said absorber sheet being thin compared with the spacing of said covers from said sheet, and the series of sheets and corresponding upper and lower covers, together with the corresponding upper and lower spacer means, defining therebetween a series of intercommunicating upper chambers and a series of intercommunicating lower chambers, respectively, said chambers extending lengthwise of said assembly,
each said upper cover being transparent to solar radiation all the way from the outside of said cover to the corresponding upper chamber,
an inlet for receiving air to be heated, disposed at one end of the upper chamber of the first of said modules,
an outlet for letting off heated air, disposed at said one end of the lower chamber of said first module,
a cowl between the other end of the upper chamber of the module farthest from said inlet and outlet and the other end of the lower chamber of said farthest module, and
means for forcing air through said inlet, said series of upper chambers, said cowl, said series of lower chambers and said outlet so that said air flows in contact with the upper surface of said absorber sheets in one direction and then in contact with the lower surface of said sheets of absorbing material in the opposite direction.

8. A solar heating unit as claimed in claim 7, wherein said inlet includes an air filter.

9. In a solar heating system for supplying drying air to a crop-drying bin:
a solar heating assembly including a plurality of serially aligned, portable solar heating modules each having
an impervious substantially rectangular absorber sheet of solar-energy absorbing material,
an upper, substantially rectangular flat cover extending parallel to said sheet,
upper spacer means for spacing edge portions of said upper cover from corresponding edge portions of said absorber sheet,
a lower substantially rectangular flat cover extending parallel to said sheet,
lower spacer means for spacing edge portions of said lower cover from corresponding edge portions of said absorber sheet,
said absorber sheet being thin compared with the spacing of said covers from said sheet, and the series of sheets and corresponding upper and lower covers, together with the corresponding upper and lower spacer means, defining therebetween a series of intercommunicating upper chambers and a series of intercommunicating lower chambers, respectively, said chambers extending lengthwise of said assembly,
each said upper cover being transparent to solar radiation all the way from the outside of said cover to the corresponding upper chamber,
an inlet for receiving air to be heated, disposed at one end of the upper chamber of the first of said modules,
an outlet for letting off heated air, disposed at said one end of the lower chamber of said first module,
a cowl between the other end of the upper chamber of the module farthest from said inlet and outlet and the other end of the lower chamber of said farthest module,
means for forcing air through said inlet, said series of upper chambers, said cowl, said series of lower chambers and said outlet so that said air flows in contact with the upper surface of said sheets of absorbing material in one direction and then in contact with the lower surface of said sheets of absorbing material in the opposite direction,
the sheet of absorbing material of each said module being more closely spaced to the upper cover than to the lower cover of said module so that the air is caused to flow through said upper chambers at a rate faster than through said lower chambers,
whereby the rise of air temperature in the upper chambers is low compared with that in the lower chambers and hence heat losses through the upper covers are reduced.

10. A solar heating unit comprising:
an upper cover of material transparent to solar radiation,
a lower cover,
an impervious sheet of solar-energy absorbing material extending lengthwise of said unit between said upper and lower cover so as to define an upper chamber and a lower chamber, respectively, said sheet being of metal having a coating of jet black on both its surfaces,
said upper chamber having at one end an inlet for receiving fluid to be heated,
said lower chamber having at said one end an outlet for letting off the heated fluid, and
there being provided means for interconnecting said chambers at the other end so that said fluid flows in contact with the upper surface of said sheet of absorbing material in one direction and then in contact with the lower surface of said sheet in the opposite direction, and
said sheet of absorbing material being more closely spaced to said upper cover than to said lower cover so that the fluid flow lengthwise of said upper chamber is at a rate faster than lengthwise of said lower chamber.

* * * * *